(No Model.)
N. T. FITCH.
TRUCK OR FRUIT BASKET.
No. 472,964. Patented Apr. 12, 1892.
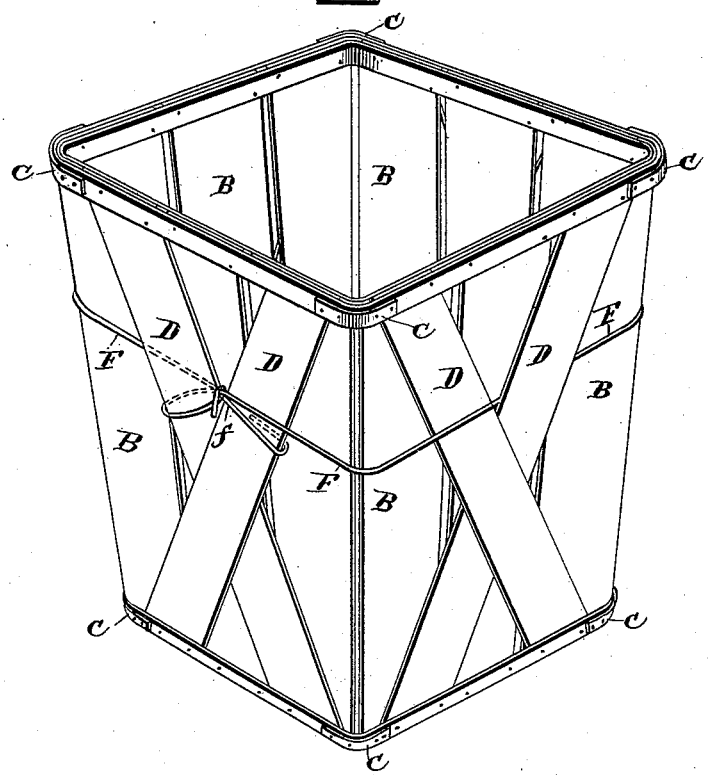
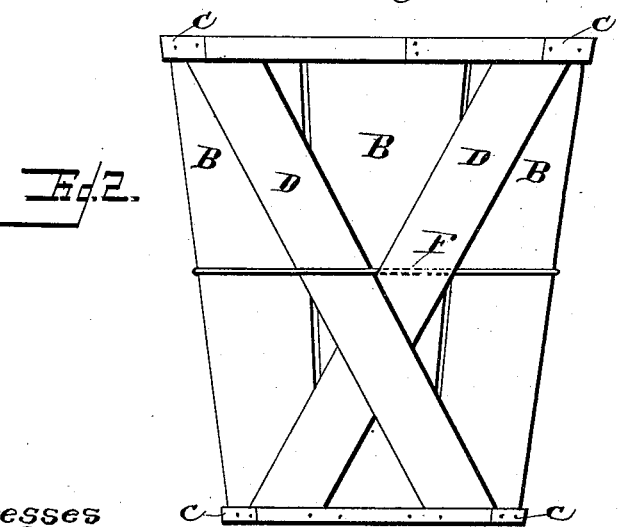

UNITED STATES PATENT OFFICE.

NATHAN T. FITCH, OF SALISBURY, MARYLAND, ASSIGNOR TO THE SALISBURY MANUFACTURING COMPANY, OF SAME PLACE.

TRUCK OR FRUIT BASKET.

SPECIFICATION forming part of Letters Patent No. 472,964, dated April 12, 1892.

Application filed November 19, 1891. Serial No. 412,449. (No model.)

*To all whom it may concern:*

Be it known that I, NATHAN T. FITCH, of Salisbury, in the county of Wicomico and State of Maryland, have invented certain new and useful Improvements in Truck or Fruit Baskets; and I do hereby declare the following to be a full, clear, and exact description of the same, reference being had to the accompanying drawings, forming a part of this specification, and to the letters of reference marked thereon.

This invention relates to improvements in baskets for truck or fruit growers and shippers in which fruit and truck or farm products are transported, the objects being to provide a more durable and cheaper basket than heretofore and one which may be more closely packed, resulting in a vast economy in the space occupied in transportation, as will be presently pointed out.

The invention consists in certain novel details of construction and combinations and arrangements of parts, all as will now be described, and pointed out particularly in the appended claims.

Referring to the accompanying drawings, Figure 1 is a perspective view of a crate or basket constructed in accordance with my invention. Fig. 2 is a side elevation showing more clearly the taper of the body and manner of applying the central band or hoop.

Similar letters of reference denote similar parts.

This class of baskets is formed almost universally of thin wood slats, which are easily shaped and held by small nails or other fasteners, a suitable wood bottom—such as A—being provided, to which the slats are secured in substantially vertical position or with the upper ends diverging slightly to give the proper flaring appearance to the basket and to facilitate "nesting." The vertical slats are lettered B, and around their upper ends is placed a hoop or band $b$, to which they are secured, while inside is a stretcher forming a complete binding or protection for the ends of the slats, besides holding them in proper relative position. Round baskets constructed in this manner have been found objectionable because of the waste space between them in storage for transportation—an important item in shipping; and to overcome this objection the bottom of my basket is square or rectangular, and the body conforms to this general shape, both the lower and the upper corners, however, being preferably slightly rounded to prevent breakage of the hoop and stretcher by being bent at a sharp angle. If desired, metallic corner-strips C are secured around each corner at both top and bottom. Braces or diagonal strips D are secured on each side of the basket, such strips being crossed at or near the center and preferably extend from each corner to the diagonally-opposite corner, as shown. Thus the twisting of the top of the basket in either direction is prevented, and each corner is provided with supporting-braces on each side, and each slat is twice crossed by the braces, making the basket exceedingly strong without materially increasing its cost, as the diagonal strips are secured beneath the top and bottom hoops which hold the vertical strips in place.

It has been customary to place a wire or metallic hoop—such as F—around the center of this class of baskets to prevent distortion at the center, which bands have been held in place by staples or similar fastenings, which prevented their movement up or down; but in the present instance I take advantage of the tapered form of the body and the crossed strips to apply this band without the necessity of additional fastening means. The bands are interwoven with the diagonal strips to prevent downward movement, and the increase in the size of the body of the basket prevents upward movement, the ends of the bands being simply twisted around the strips on one side, as shown in Fig. 1 at $f$, to secure them in place; or the ends of the wire may be fastened together before putting on the basket.

The hoops and structure, it is obvious, may be formed of a number of strips, if preferred, thus economizing material, and the shape of the basket may be other than square; but because of the economy of this form it is greatly to be preferred, for not only is a square or rectangular bottom cheaper and more easily made, but, as before stated, the economy in space during transportation is sufficient to counterbalance any possible disadvantage. For instance, actual demonstration shows that a car of ordinary size will hold one hundred and fifty-six stacks of, say, thirty-five each, of the ordinary round baskets, while with the square form the same car will hold forty-seven additional stacks, or over twenty-five per cent. more, and, as they are shipped by the car-load regardless of weight, the saving is an important item to the manufacturer.

I claim—

1. As an improved article of manufacture, a fruit or truck basket composed of the square or rectangular bottom, substantially vertical slats secured thereto, the top hoop, and the braces on each side extending from each corner to the diagonally-opposite corner and crossed at or near the center, whereby each corner is supported on each side, substantially as described.

2. As an improved article of manufacture, a fruit or truck basket having the tapered body formed by the substantially vertical slats, the diagonal crossed braces overlying the vertical slats, and the central band passing around outside the vertical slats and interwoven with the crossed slats under the inner one and over the outer one, whereby it is held against downward movement, substantially as described.

NATHAN T. FITCH.

Witnesses:
S. C. DOUGHERTY,
G. W. PARSONS.